United States Patent
Boukhny et al.

(10) Patent No.: US 6,941,813 B2
(45) Date of Patent: Sep. 13, 2005

(54) NONINVASIVE PRESSURE SENSING ASSEMBLY

(75) Inventors: Mikhail Boukhny, Laguna Niguel, CA (US); Xiaoxiao Zhang, Fort Worth, TX (US)

(73) Assignee: Alcon, Inc., Hunenberg (CH)

( * ) Notice: Subject to any disclaimer, the term of this patent is extended or adjusted under 35 U.S.C. 154(b) by 0 days.

(21) Appl. No.: 10/610,087

(22) Filed: Jun. 30, 2003

(65) Prior Publication Data

US 2004/0261534 A1 Dec. 30, 2004

(51) Int. Cl.⁷ .................................................. G01L 9/00
(52) U.S. Cl. ........................................... 73/705; 73/715
(58) Field of Search .................................. 73/700–756

(56) References Cited

U.S. PATENT DOCUMENTS

| | | |
|---|---|---|
| 2,583,941 A | 1/1952 | Gordon, Jr. |
| 3,805,617 A | 4/1974 | Kamazuka |
| 3,842,353 A * | 10/1974 | Stewart ...................... 324/109 |
| 4,158,310 A * | 6/1979 | Ho .............................. 73/705 |
| 4,255,966 A * | 3/1981 | Batie et al. .................... 73/81 |
| 4,281,666 A | 8/1981 | Cosman |
| 4,281,667 A | 8/1981 | Cosman |
| 4,322,978 A * | 4/1982 | Fromm ......................... 73/705 |
| 4,378,701 A * | 4/1983 | Mountain et al. ............. 73/808 |
| 4,428,239 A * | 1/1984 | Johnston ...................... 73/705 |
| 4,452,202 A | 6/1984 | Meyer |
| 4,505,157 A | 3/1985 | Hong Le |
| 4,539,849 A | 9/1985 | Pike |
| 4,541,283 A | 9/1985 | Stuhlmann |
| 4,625,559 A * | 12/1986 | Carter et al. ................... 73/706 |
| 4,653,508 A | 3/1987 | Cosman |
| 4,755,669 A | 7/1988 | Grant et al. |
| 4,886,070 A | 12/1989 | Demarest |
| 4,892,985 A | 1/1990 | Tateishi |
| 4,933,545 A * | 6/1990 | Saaski et al. ........... 250/227.14 |
| RE33,360 E | 10/1990 | Reynolds |
| RE33,518 E | 1/1991 | McCord et al. |
| 5,029,478 A | 7/1991 | Wamstad |
| 5,080,098 A | 1/1992 | Willett et al. |
| 5,095,401 A | 3/1992 | Zavracky et al. |
| 5,144,843 A | 9/1992 | Tamura et al. |
| 5,257,630 A | 11/1993 | Broitman et al. |
| 5,275,053 A | 1/1994 | Wlodarczyk et al. |
| 5,319,978 A * | 6/1994 | Grudzien, Jr. ............... 73/705 |
| 5,333,504 A | 8/1994 | Lutz et al. |
| 5,351,547 A * | 10/1994 | Grudzien et al. ............. 73/705 |
| 5,353,633 A | 10/1994 | Benedikt et al. |
| 5,392,653 A | 2/1995 | Zanger et al. |
| 5,460,049 A | 10/1995 | Kirsch |
| 5,470,312 A | 11/1995 | Zanger et al. |
| 5,528,214 A | 6/1996 | Koga et al. |
| 5,583,297 A | 12/1996 | Stocker et al. |
| 5,661,245 A | 8/1997 | Svoboda et al. |

(Continued)

FOREIGN PATENT DOCUMENTS

| | | | |
|---|---|---|---|
| JP | 56112609 A * | 9/1981 | .......... G01D/21/02 |
| WO | WO 88/04042 | 6/1988 | |
| WO | WO 93/24817 | 12/1993 | |
| WO | WO 99/23463 | 5/1999 | |

*Primary Examiner*—William Oen
*Assistant Examiner*—Jermaine Jenkins
(74) *Attorney, Agent, or Firm*—Armando Pastrana, Jr.

(57) ABSTRACT

An optical noninvasive pressure sensing assembly capable of accurately indicating relatively minute pressure changes. The present invention generally includes a light source, such as a Light Emitting Diode (LED) or normal room illumination, positioned to reflected light off of a surface of a membrane. The membrane is in contact with the fluid in which the pressure is to be measured so that changes in the pressure in the fluid cause movement of the membrane. A charge coupling device (CCD) camera captures light reflected off of the membrane and the reflected light is analyzed to determine the relative movement of the membrane based on the change in the pattern of the reflected light.

2 Claims, 3 Drawing Sheets

U.S. PATENT DOCUMENTS

| | | |
|---|---|---|
| 5,752,918 A | 5/1998 | Fowler et al. |
| 5,848,971 A | 12/1998 | Fowler et al. |
| 5,866,822 A | 2/1999 | Willig |
| 5,880,373 A | 3/1999 | Barton |
| 5,910,110 A | 6/1999 | Bastable |
| 6,005,242 A * | 12/1999 | Chernyak .............. 250/227.14 |
| 6,058,779 A | 5/2000 | Cole |

* cited by examiner

NONINVASIVE PRESSURE SENSING ASSEMBLY

BACKGROUND OF THE INVENTION

The present invention relates generally to pressure sensors and more specifically to noninvasive pressure sensing.

Various devices have been developed over the years for measuring or sensing the pressure in a volume of fluid. Many of these devices have a load cell containing probe or other sensing apparatus that must physically contact the fluid being measured. While in many mechanical applications (for example, an oil pressure sensor used on an internal combustion engine), physical contact between the probe and the fluid raises no particular concerns, such contact is undesirable in medical applications where the fluid may be a virally or microbially contaminated biological fluid. Under these circumstance, if the probe is allowed to contact the biological fluid, the probe must either be discarded or sterilized prior to reuse. Therefore, in medical applications, it is important that the pressure sensor not contact the fluid being measured.

Several noninvasive pressure sensors have previously been disclosed in U.S. Pat. Nos. 1,718,494, 2,260,837, 2,510,073, 2,583,941 and 3,805,617, the entire contents of which are incorporated herein by reference. These devices use a metal disk moving within the electromagnetic field of an energized coil to sense pressure changes. As the iron disk moves closer or farther from the coil, the current flow through the coil varies, and these current fluctuations can be used to calculate pressure changes. While these devices are satisfactory for measuring relatively large pressure changes, more minute pressure changes do not cause the current to fluctuate to a sufficient degree to provide an accurate and reliable indicator of pressure variation.

Other pressure sensors avoid contacting the fluid being tested by using a test chamber separated into two parts by a flexible diaphragm. The fluid volume being measured is contained on one side of the chamber and the pressure sensor is in communication with the second side of the chamber. Any increase or decrease in the fluid pressure causes the diaphragm either to expand into the second side of the chamber or to be pulled into the fluid part of the chamber, thereby increasing or decreasing the pressure in the second side of the chamber an amount corresponding to the change in fluid pressure in the first side of the chamber. While these diaphragm type pressure sensors do not invade the test fluid and can be used to detect relatively small pressure changes, the accuracy of such sensors relies to a great extent on the compliance or elastic properties of the diaphragm, properties that can be hard to control during manufacture and that may change over time as the diaphragm is repeatedly stretched and relaxed.

Another noninvasive pressure sensor described in PCT Publication No. WO 93/24817 (corresponding to U.S. Pat. No. 5,392,653) uses a flexible diaphragm with an attached magnet. By attaching an iron disk to the diaphragm, the diaphragm is mechanically coupled to the transducer. In order for the transducer to measure the pressure accurately, the diaphragm is extremely flexible. Nevertheless, variations in the flexibility of the diaphragm affect the accuracy of the pressure measurements. In addition, this assembly relies on firm contact between the magnet and the transducer, variations of which will also affect the accuracy of the pressure measurement. Another noninvasive pressure sensor is disclosed in PCT Publication No. WO 99/23463. This pressure sensor includes a pressure chamber separated from the pressure transducer by a thin, compliant membrane. As with the previously described device, this device relies on the use of a bulky and relatively expensive load cell and stepper motors to position the load cell against the diaphragm Accordingly, a need continues to exist for an inexpensive, reliable and accurate pressure sensor capable of detecting relatively small pressure changes in a fluid without contacting the fluid.

BRIEF SUMMARY OF THE INVENTION

The present invention improves upon prior art pressure sensors by providing an optical noninvasive pressure sensing assembly capable of accurately indicating relatively minute pressure changes. The present invention generally includes a light source, such as a Light Emitting Diode (LED) or normal room illumination, positioned to reflected light off of a surface of a membrane. The membrane is in contact with the fluid in which the pressure is to be measured so that changes in the pressure in the fluid cause movement of the membrane. A charge coupling device (CCD) camera captures light reflected off of the membrane and the reflected light is analyzed to determine the relative movement of the membrane based on the changes in the pattern of the reflected light.

Accordingly, one objective of the present invention is to provide an optical noninvasive pressure sensing assembly.

Another objective of the present invention is to provide a relatively inexpensive pressure sensing assembly.

Still another objective of the present invention is to provide a pressure sensing assembly that can measure pressures less than ambient pressure.

Still another objective of the present invention is to provide a pressure sensing assembly that will measure pressures different than ambient pressure.

These and other advantages and objectives of the present invention will become apparent from the detailed description, drawings and claims that follow.

DETAILED DESCRIPTION OF THE INVENTION

Figure 1:
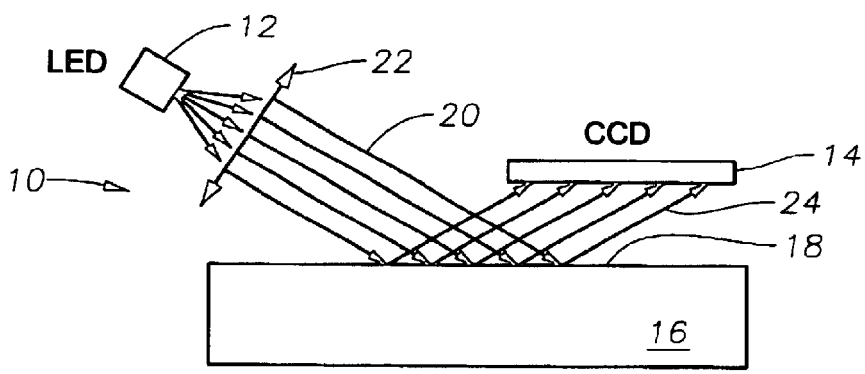
FIG. 1 is a schematical illustration of the pressure sensing assembly of the present invention.

As can be seen in FIG. 1, pressure sensing assembly 10 of the present invention generally includes a light source, such as LED 12, CCD 14, pressure chamber 16 and flexible membrane 18. Pressure chamber 16 containing a fluid having a pressure to be measured and may be made of any suitable material, such as metal, glass or plastic, may be of any suitable size or shape and contains a port (not shown) through which the pressure in chamber 16 may be varied. Diaphragm 18 may be made of any suitably compliant material having good dimensional stability, such as stainless steel. LED 12 may be any of a variety of commercially available LEDs, such as a super luminescent LED and directs light 20 toward membrane 18 through lens or lenslette array 22. Light 24 reflected off of diaphragm 18 is captured by CCD 14, which may be any of a variety of commercially available devices.

Figure 2:
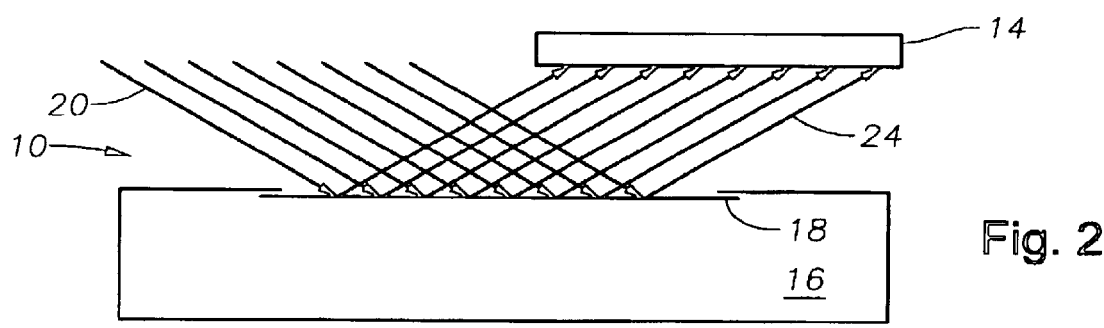
FIG. 2 is a schematical illustration of a first embodiment of the pressure sensing assembly of the present invention showing the pressure sensing membrane at ambient pressure.
Figure 3:
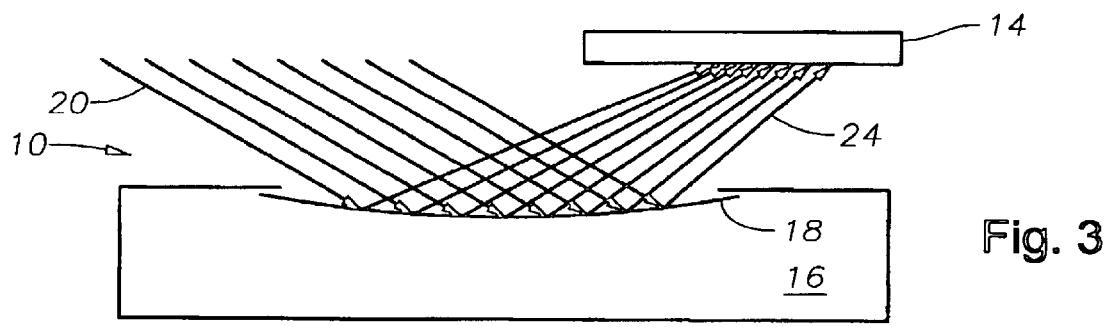
FIG. 3 is a schematical illustration of a first embodiment of the pressure sensing assembly of the present invention showing the pressure sensing membrane under a vacuum.

As best seen in FIGS. 2 and 3, light 20 from LED 12 is focused by lens 22 at an angle onto membrane 18 so that light 20 is reflected off of membrane 18 as reflected light 24 and onto CCD 14. When the pressure within chamber 16 is at or near ambient, as seen in FIG. 2, membrane 18 will be relatively flat, and the angle of reflected light 24 will be approximately the same as light 20, causing the pattern of reflected light 24 falling on CCD 14 to be approximately the same as the pattern formed by light 20 emanating from lens 22. When the pressure within chamber 16 is below ambient, as shown in FIG. 3, membrane 18 will be deflected inward (concave), causing reflected light 24 to be more tightly focused on CCD 14 than light 20 emanating from lens 22. One skilled in the art will recognize that in a similar manner, pressures in chamber 16 above ambient will cause membrane 18 to be convex (not shown) and reflected light 24 falling on CCD 14 will be more scattered than light 20 emanating from lens 22. The pattern of reflected light 24 can be captured by CCD 14 and analyzed using software well-known in the art and the relative position and movement of membrane 18 calculated. Alternatively, the pattern of reflected light 24 captured by CCD 14 can be analyzed using a wavefront measurement device, such as the one described in U.S. Pat. No. 6,460,997 B1 (Frey, et al.), the entire contents of which being incorporated herein by reference. The position of movement of membrane 18 directly relates to the pressure and pressure changes within chamber 16.

Figure 4:
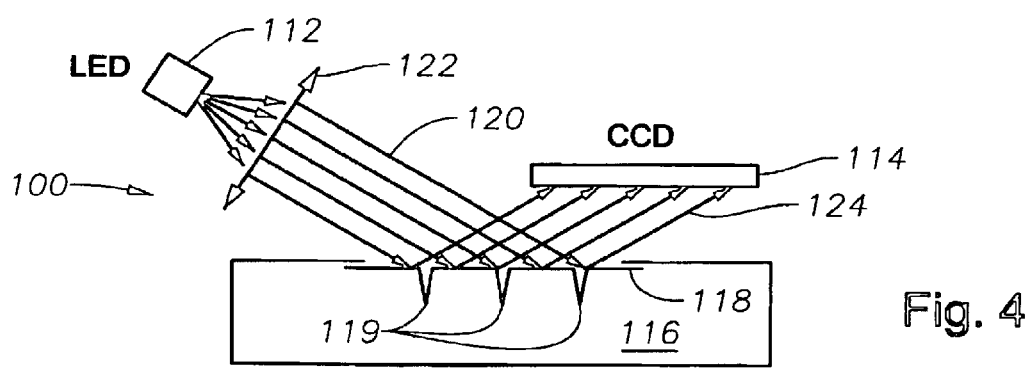
FIG. 4 is a schematical illustration of a second embodiment of the pressure sensing assembly of the present invention.
Figure 5:
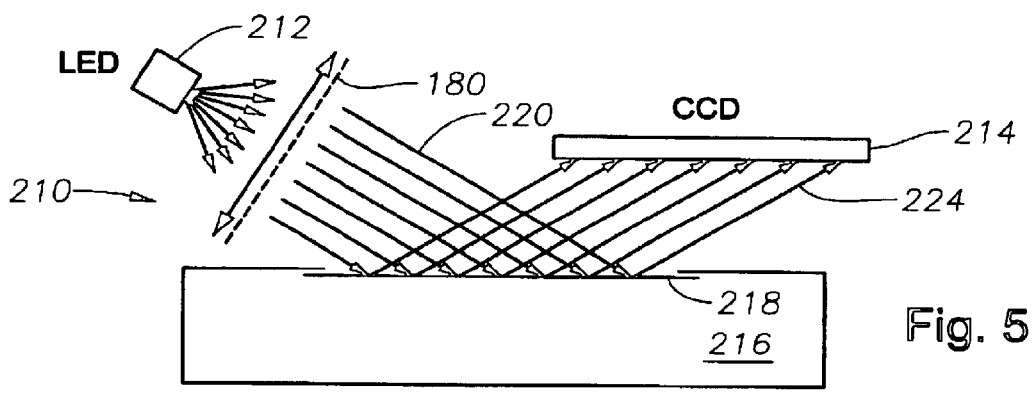
FIG. 5 is a schematical illustration of a third embodiment of the pressure sensing assembly of the present invention.
Figure 6A:
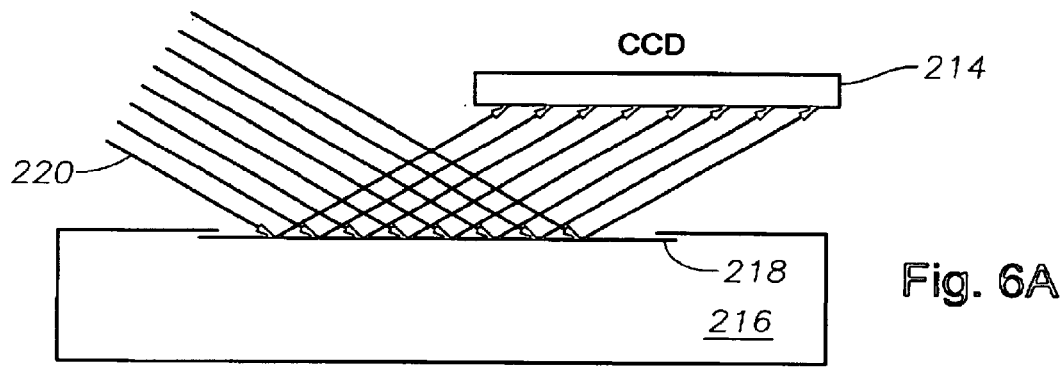
FIG. 6A is a schematical illustration of a third embodiment of the pressure sensing assembly of the present invention showing the pressure sensing membrane at ambient pressure.
Figure 6B:
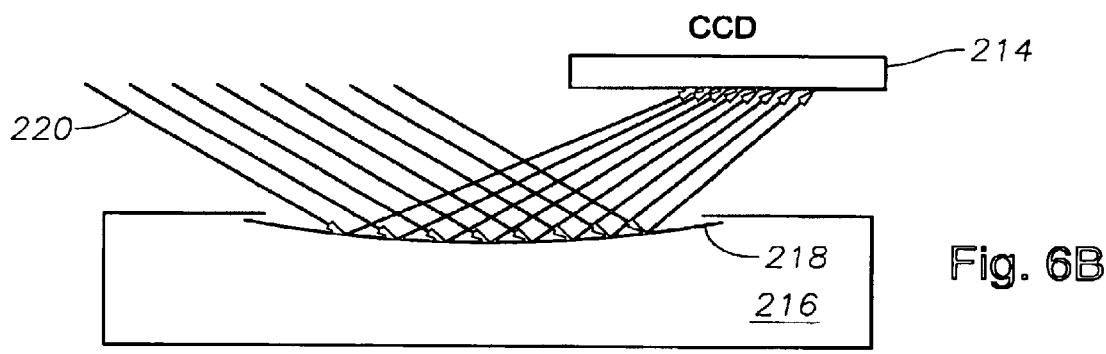
FIG. 6B is a schematical illustration of a third embodiment of the pressure sensing assembly of the present invention showing the pressure sensing membrane under a vacuum.
Figure 7:
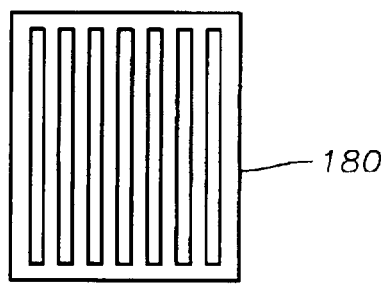
FIG. 7 is a plan view of a first grating that may be used with the third embodiment of the pressure sensing assembly of the present invention.

As best seen in FIG. 4, in a second embodiment 100 of the pressure sensing assembly of the present invention, membrane 118 contains a plurality of grooves, pits or other non-reflective areas 119. The pattern of areas 119 is projected onto CCD 114 by reflected light 124, and this pattern may be analyzed to determine the pressure within chamber 116 as described above. The use of areas 119 allows the use of a conventional focusing lens 122 rather than a lenslette array to form light 120, and such lens 122 may be formed as part of LED 112.

Figure 8:
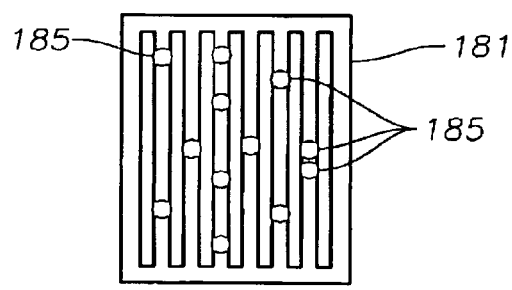
FIG. 8 is a plan view of a second grating that may be used with the third embodiment of the pressure sensing assembly of the present invention.
Figure 9:
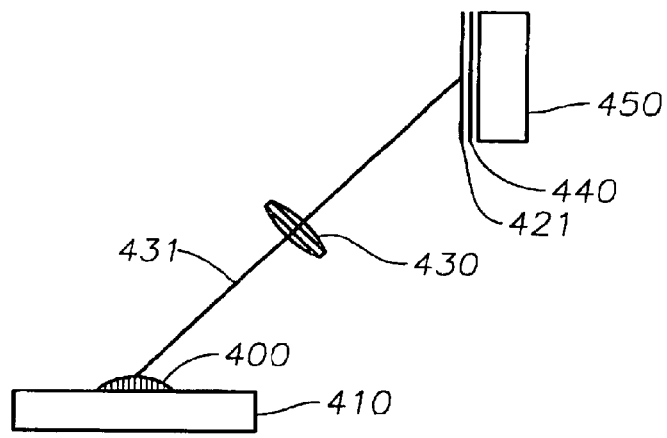
FIG. 9 is a schematical representation of a fourth embodiment of the pressure sensing assembly of the present invention.
Figure 10:
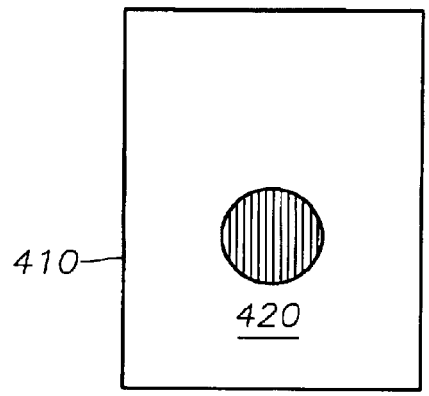
FIG. 10 is a top plan view of a chamber and membrane that may be used with the fourth embodiment of the pressure sensing assembly of the present invention.

As best seen in FIGS. 5–8, in another embodiment of the present invention, LED 212 emits light 220 through grating 180 so as to form an image of grating 180 onto membrane 216 on chamber 216 that is reflected off of membrane 218 as reflected light 224 and on to CCD 214. As seen in FIGS. 6A–6B, when the pressure within chamber 216 is at ambient, the pattern reflected of reflected light 224 onto CCD 214 will be roughly identical to the pattern on grating 180. When the pressure within chamber 216 is below ambient, membrane 218 will bow in slightly, resulting in the pattern of reflected light 224 reflected on to CCD 214 to have a tighter grid spacing than grating 180. This change in grid spacing may be analyzed to determine the pressure within chamber 216 as described above. One skilled in the art will recognize that other pattern(s) besides a rectangular grid may be formed in grating 180. For example, as seen in FIG. 8, grid 181 may contain a plurality of random or patterned holes 185 in its structure. The pattern of holes 185 can be analyzed prior to measuring pressure in chamber 216 to help calibrate system 210 or to indicate when system 210 is not functioning properly.

Figure 11:
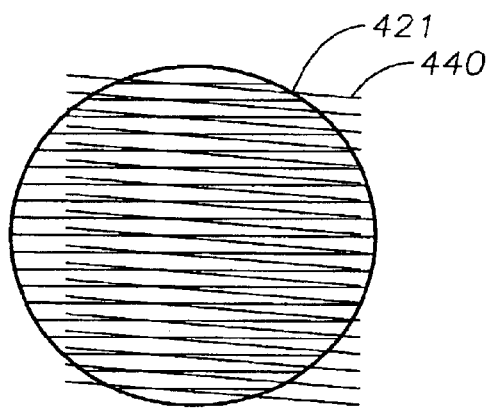
FIG. 11 is a schematical representation of one of the Moiré fringe formations used in the fourth embodiment of the pressure sensing assembly of the present invention.
Figure 12:
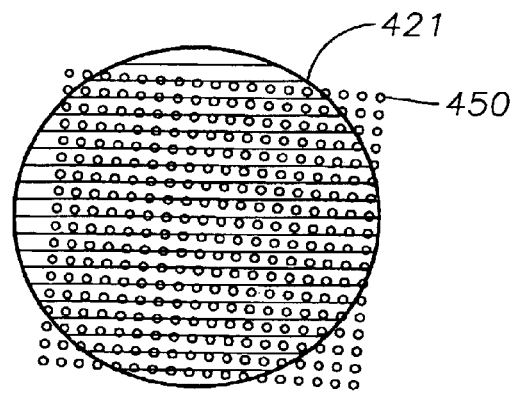
FIG. 12 is a schematical representation of another Moiré fringe formation used in the fourth embodiment of the pressure sensing assembly of the present invention.

As best seen in FIGS. 9–12, in assembly 410 of a fourth embodiment of the present invention, grating 420 is made on the surface of membrane 400. General illumination of the area of membrane 400 makes grating 420 visible to Scheimflug imaging optics lens 430. The Scheimflug imaging optics is constructed by having optical axis 431 of lens 430 aligned at an angle of 45° to the surface normal of membrane 400 and CCD 450. With illumination, grating 420 is imaged by lens 430, resulting in grating image 421 being formed. Image 421 has at least two useable Moiré fringe formations. The first method of Moiré fringe formation is formed by allowing image 421 to be formed directly on CCD 450 and allowing the receptor pixel array of CCD 450 form Moiré fringes. The Moiré image can then be extracted using appropriate software to read the pixel images, as shown in FIG. 12. The second method of Moiré fringe formation is placing second grating 440 near CCD 450 so as to form Moiré fringes on CCD 450, as shown in FIG. 11. The angle between image 421 and grating 440, as shown in FIG. 11, and the angle between image 421 and CCD 450, as shown in FIG. 12, can be changed to adjust the Moiré fringe spacing and thus, the detection sensitivity of the pressure detection. The smaller the angle, the higher the sensitivity.

Pressure sensing assembly 10, 100, 210 or 410 of the present invention allows the noninvasive measurement of pressure within a chamber. Provided that diaphragm 18, 118, 218 or 400 is made sufficiently large, contaminates on a portion diaphragm 18, 118, 218 or 400 will not prevent system 10, 100, 210 or 410 from detecting the pressure within chamber 16, 116, 216 or 316 as sufficient reflected light 24, 124 or 224 will reach CCD 14, 114, 214 or 450 from noncontaminated portions of diaphragm 18, 118, 218 or 400. In addition, the use of a polarizer (not shown) will improve the signal to noise ratio because reflected light 24, 124 or 224 will be largely polarized while ambient light reflected off of membrane 18, 118, 218 or 400 will have no pronounced polarization. One skilled in the art will also recognize that by varying the thickness of diaphragm 18, 118, 218 or 400, the focal power of lens 22, 122 or 430 and/or the relative positions of the components, the pressure range that can be detected by assembly 10, 100, 210 or 410 can be adjusted so that individual rays of light within light 20, 120 or 220 do not overlap.

This description is given for purposes of illustration and explanation. It will be apparent to those skilled in the relevant art that modifications may be made to the invention as herein described without departing from its scope or spirit.

We claim:

1. A noninvasive pressure sensing assembly, comprising:
   a) a pressure chamber having a flexible membrane;
   b) a grating on the membrane;
   c) a charge coupled device arranged so that light reflected off of the membrane is reflected on to the charge coupled device; and
   d) a means for forming a Moiré fringe formation on the charge coupled device.
2. The assembly of claim 1 wherein the light reflected on to the charge coupled device is reflected at an angle of 45°.

* * * * *